Inventors.
EDUARD KÜSTERS
VALENTIN APPENZELLER

BY

ATTORNEYS

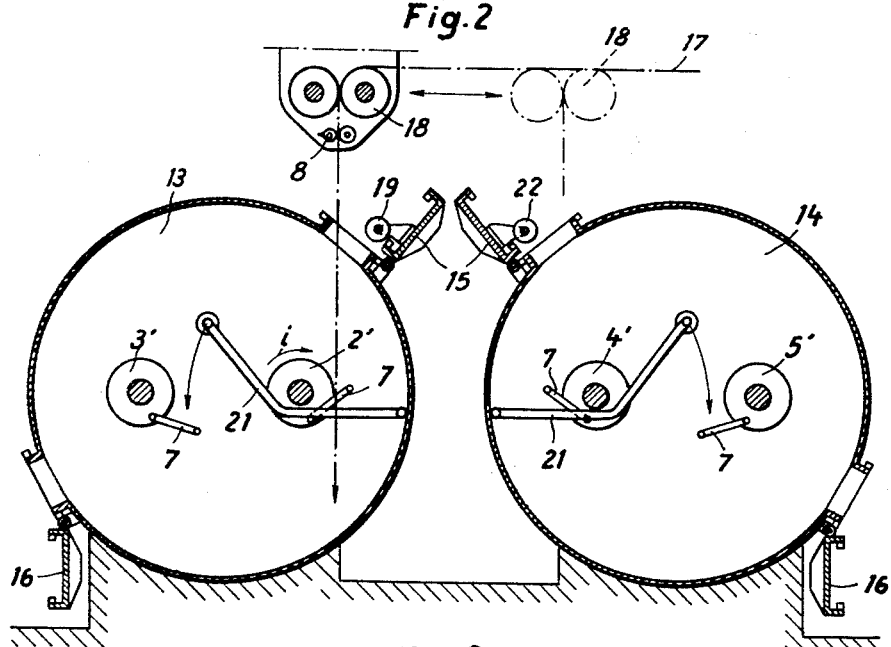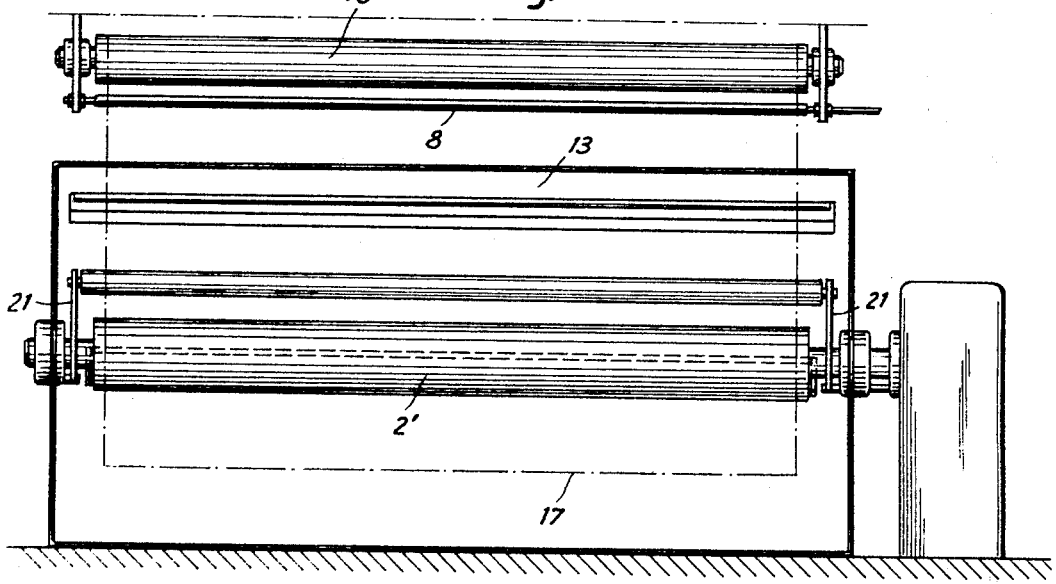

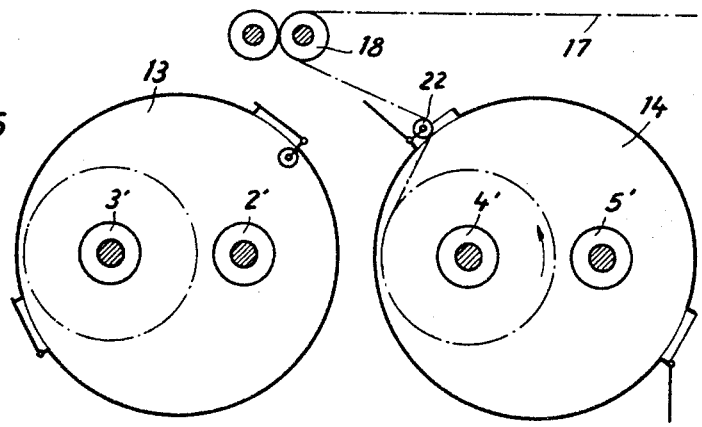
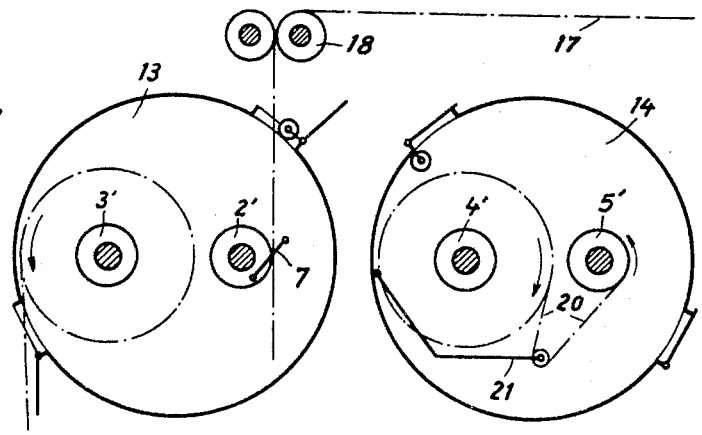
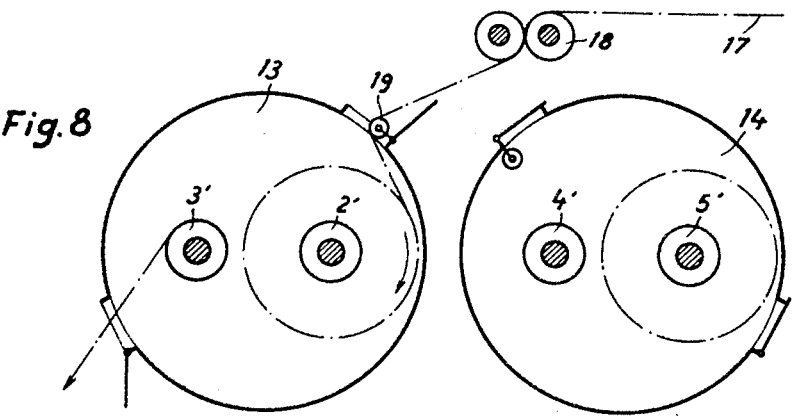

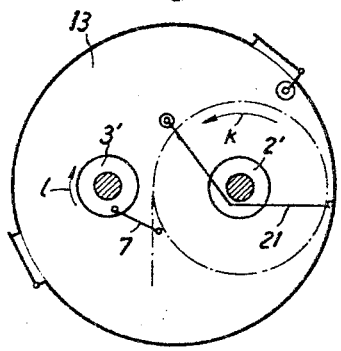
Fig. 9
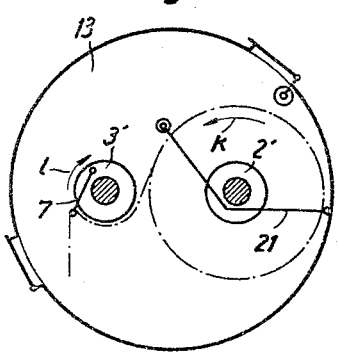
Fig. 10
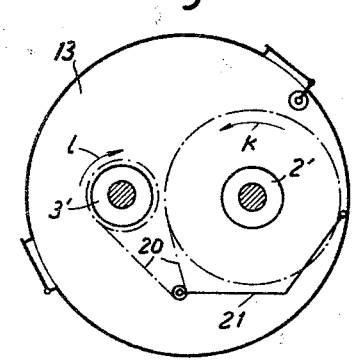
Fig. 11
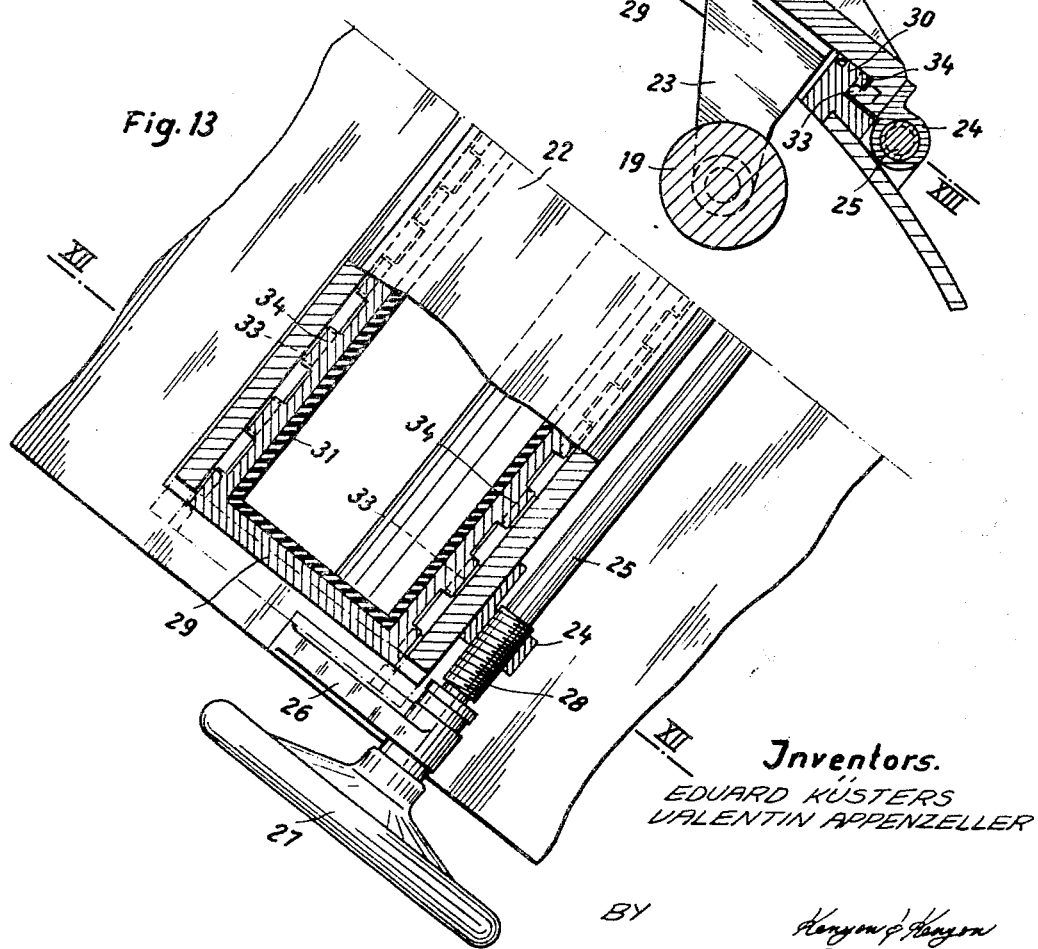
Fig. 12
Fig. 13
Inventors.
EDUARD KÜSTERS
VALENTIN APPENZELLER
BY
Kenyon & Kenyon
ATTORNEYS

United States Patent Office

3,448,469
Patented June 10, 1969

3,448,469
METHOD AND MEANS FOR THE DELAYED PASSING OF TEXTILE AND OTHER BREADTHS THROUGH A PROCESSING CHAMBER
Eduard Küsters, 457 Gladbacher Str., Krefeld, Germany, and Valentin Appenzeller, 13 Am Nagelkreuz, Kempen (Lower Rhine), Germany
Filed Apr. 11, 1967, Ser. No. 630,023
Claims priority, application Germany, Feb. 14, 1967, K 61,418
Int. Cl. D06c 1/00; D06f 37/00
U.S. Cl. 8—150          5 Claims

ABSTRACT OF THE DISCLOSURE

The following disclosure includes a method and means for exposing breadth of textile or the like to processing by steaming, heating, liquid contact, etc. Two rolls are enclosed as a pair in a chamber and a length of the breadth to be exposed to the processing medium in the chamber is wound on one roll and from this roll by reversing its winding direction is wound on the other roll from which it is unwound by reversal of this roll and pulled from the chamber. More than one pair of rolls may be used.

---

The present invention relates to a method and means for the delayed passing of textile and other breadths, especially for moist and temperature processing thereof, for instance in a steam atmosphere, for dyeing, bleaching, steaming, finishing and similar operations, through a processing chamber in a winding system in which the breadth is wound up to form a winding in the chamber when fed in and after processing is drawn off from the winding as well as pulled out of the chamber.

For such processing of large width breadths at high temperatures and under pressure it has been suggested wind the breadth in a boiler from one roll onto another roll and, duing such winding, to apply processing liquid on the transition path of the breadth between the two rolls. In this event the boiler may have been subdivided into two boilers adjacent to each other in their longitudinal sense the interior spaces of which are connected to each other by means of a slot or gap parallel to the transition path. With one of these boilers one of the front walls has been designed as a door while the bottom has been provided with rails. The rails are intended for pulling in a carriage on the rails and supporting the breadth winding or skein respectively which is to be subject to processing, said carriage having been provided with a frame and roll to receive the breadth. The other boiler has been provided with closed front walls and contains a roll to receive the breadth winding. Its jacket has been provided with a manhole in order to be able to attach the breadth end to the roll.

For the processing of the breadth the carriage comprising the frame on which the breadth is supported is introduced into one of the boilers via the open front wall thereof whereupon the front wall is closed. Via the open-end manhole of the other boiler the breadth end is attached on the empty shaft or roll within said boiler, and processing liquid is introduced into the boiler. The manhole is then closed and subsequently the breadth is wound from the frame which has been introduced into one of the boilers onto the roll within the other boiler while treatment is applied to the breadth path between the two windings. The boilers are subject to steam pressure the amount of which, however, may be but limited. After winding has been completed, the manhole will be opened and the material is removed via the manhole, whereupon the front wall of one of the boilers is opened and the frame is removed in order to be wound anew.

Even proceeding with two ingoing and outgoing carriages in a boiler is already known. It is also known to impregnate textile breadths by means of a dye solution, then to wind up and to rewind the same in a closed chamber under steam pressure in which case the windings are ingoing and outgoing.

This periodical method is very complicated requiring considerable interruptions of processing times.

Methods and means for wet treatment of breadths in processing chambers are also already known according to which the breadth is continuously stored or guided through the processing chamber in a winding system. With these means a pair of winding rolls has been provided within the processing chamber. When the process is started the breadth is first wound up in one layer onto one roll of the pair of rolls, and as soon as half of the winding amount or half of the winding contents has been completed, a buckling fold is produced in the breadth which is applied to the roll which is still empty. Then, while the direction of rotation of the first roll is altered and feeding of the breadth is continued, the other roll to be wound is wound in two layers until the beginning of the breadth which has been wound in is free again. Afterwards the direction of rotation of the roll is changed and the breadth end which has been introduced first is guided towards the outside. At the same time moreover the ingoing breadth is attached to the first roll while forming a buckling fold so that a complete winding of the breadth in two layers is produced on the first roll while the second roll is being unwound.

The above two layer proceeding will be suitable for great breadth amounts of identical width and identical quality.

When winding is effected in two layers, it will not be possible to wind a wider textile breadth on a narrow one already wound in or vice versa a narrow breadth on a wider one. Since with the two layer method back winding will always be required, there will always be conditions where material breadths of different width are wound up on a single winding. The wide material breadth is without support at the sides, a fact which necessarily results in folding. Further problems will arise as soon as material breadths of different qualities, espectially of different strengths, are to go in, for instance, when a breadth weighing 100 gr/m.$^2$ is to be followed by a breadth weighing twice as much. In such an event the winding diameter would considerably be increased upon two layer back winding, since the number of layers resulting from the previous steps must be maintained. Consequently, with the lighter material, the number of layers has to be predetermined within a smaller range so that within the total system the operating speed is considerably reduced in the presence of the same contact time.

These are additional reasons why the two layer winding system can only be employed by large plants which are dealing mainly with always the same quality and always the same breadths. With each change, for instance, of the material breadth, the entire chamber must be emptied and a wider or narrower breadth introduced when the double layer winding system is used. In this connection handling of the new introduction step is very complicated, especially so because first one-half of the breadth will have to be wound up on one roll, then the buckling fold will have to be produced followed by rewinding, and there is the additional disadvantages of the necessity to readjust the predetermined time of treatment. All this results in stopping the machines for prolonged periods of time.

In addition, when practicing double layer winding with the same roll arbor diameter the time of effective treatment will only be fifty percent as compared to the present invention described in the following.

There is a genuine demand in the textile industry for dyeing, bleaching and finishing processes under a prolonged period of contact time under the processing conditions, which, apart from treating large amounts, will also be suitable for the processing of smaller amounts of a variety of widths and qualities and which, despite that, may be performed under such conditions that practically correspond to a continuous process.

The present invention is based upon the fact that such universal process will be possible if with breadths continuously introduced into the processing chamber at any predetermined time the breadths are automatically separated, even if of varying width, automatically taken up again for winding up, rewinding and winding out and passed on.

The main object of the present invention is to provide, within the meaning of such process with one layer winding steps, non-continuous processing steps in such a sequence that, on the whole, there will be a substantially continuous process, i.e. comprising winding up, rewinding and winding out, inside of chambers partly or completely closed.

It is another object of the present invention to provide a possibility for high pressure steam treatment of breadths in a more or less continuous sequence without introducing the material into the processing chamber on already prepared windings or without removing again unwound windings from the chamber after completed treatment non-continuously.

Mainly, this problem has been solved according to the present invention in that operation is effected by means of a plurality of, preferably two, winding up roll and rewinding roll pairs, of which at least one pair is located and solidly fixed in a chamber, and preferably in that a change of the breadth feed is made alternately with the breadth when fed after a previous separation, the breadth feeding to the winding up roll of one pair and then to the winding up roll of the other pair, and from the wound winding up roll of the previous pair to the rewinding roll belonging to the same, and from the wound rewinding roll of the pair with the winding up roll ready for winding up, to the exit or outgoing end.

In this case the individual operating times have practically been harmonised such that completed drawing off of the breadth from the rewinding roll as well as completed winding up of the winding up roll of one pair and, together with these steps, ending of completed rewinding and starting of winding up of the other pair are all coinciding steps or, intermediate times considered, are about coinciding.

By the present invention it will be achieved that, despite of non-continuous treatment of the breadth within the chamber, there will be an effect which is similar to the effect resulting from continuous processing, since constantly after completed introduction of a non-continuous step the initiation of the next discontinuous step is effected while the completely initiated step in any case is taking place within that time during which initiation of the next step will be completed, whereupon again a feed change for the introduction of a new first step occurs. During initiation of a step by breadth feeding the breadth of the completed step is drawn off or going out.

Practically, rewinding from the winding up roll onto the rewinding roll is effected by means of a loop or span between the rolls resulting in a contact path of the breadth where the latter is exposed to steam or liquid and also in prolonged heating time.

It will, of course, even be possible to provide for interruptions when changing the feed from one of the winding up rolls to the other winding up roll.

Another advantage of the method according to the present invention is that the entire length of the breadth to be subject to contact with steam, liquid, heat, etc., will be treated.

The method may performed at atmospheric steam pressure or a steam pressure of 1 absolute atmosphere and also at higher steam pressure, favorably up to 5 atmospheres above atmospheric pressure.

In principle high steam pressure treatment will also be possible in a chamber comprising four winding elements. This would merely necessitate a separation wall between the two winding pairs. The two chambers thus resulting might be opened and closed, as described in the following, in order to wind up at a steam pressure of 1 absolute atmosphere and, after closing the chamber in question, to rewind at a higher steam pressure.

If higher steam pressures are to be applied, however, considering the fluid pressure involved, this would result in a less favorable design and the chamber would be comparatively expensive.

It is preferable in view of the above, while maintaining the basic scheme, to locate one winding pair each in one chamber each in which case the effect similar to the continous method is maintained.

In particular, two processing chambers, separated and parallel to each other, may be provided each containing one pair of rolls solidly installed which are wound alternately such that, during material feed and material exist in one processing chamber which is open, rewinding as well as contacting of the breadth is effected in the other processing chamber while this latter chamber is closed and subject to pressure.

Feeding into each chamber may be normal. Subsequent to feeding or subsequent to completed winding up or shortly before completion of winding up onto the winding up roll, the breadth is separated and the chamber is closed after completion of winding up. The chamber is then exposed to pressure and the material will be rewound. During winding up the breadth may already be preheated, for instance, by spraying steam against the ingoing breadth. The ceiling of the chamber may be heated in order to prevent formation of condensate which, when dropping down, would result in condensate areas on the breadth.

When in the first chamber processing, and in the second chamber winding up of the fed in breadth after separation as well as drawing off of the breadth already treated, has been completed, the second chamber is closed and pressure is switched over to this chamber, where then rewinding will be effected. This sequence will be continued alternately.

Under certain conditions the present invention will also be suitable for washing out of, for instance, alkalines, since as a rule washing out requires a prolonged diffusion time.

The drawing is a diagram of two examples of a construction according to the present invention.

FIG. 2 is across section of a steamer construction operating with overpressure.

FIG. 2a is a longitudinal view of the rolls of FIG. 2 as seen from the left hand side thereof while the left chamber has been shown in a vertical section by dotted lines.

FIGS. 3 through 8 show the operating method of an overpressure steamer.

FIGS. 9 through 11 respectively, show the transfer and the formation of a loop upon rewinding from the winding up roll onto the rewinding roll.

FIG. 12 is a cross section of the cover construction in a unit according to FIG. 2 the section being taken on the line XII—XII in FIG. 13.

FIG. 13 is a plane view of the cover as shown in a partial section taken on the line XIII—XIII in FIG. 12.

Figure 1:
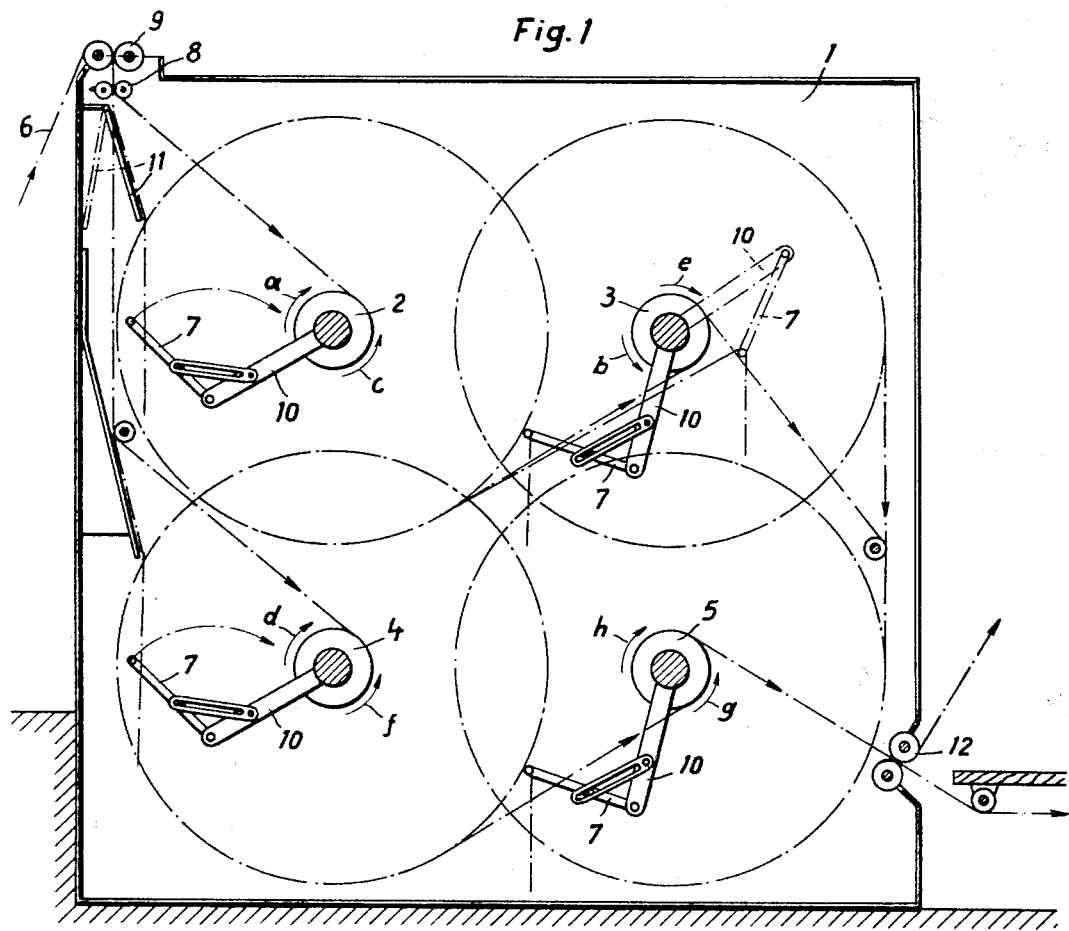
FIG. 1 is a vertical section of a processing chamber or contact chamber for steaming at atmospheric pressure.

In FIG. 1 the processing chamber or steamer chamber has been defined as 1. Two pairs of rolls 2,3 and 4,5 are located within said chamber. The rolls 2 and 4 are winding up rolls for winding up the ingoing breadth 6, and the rolls 3 and 5 are rewinding rolls upon which the breadth is rewound from the winding up rolls when a winding up roll is wound. Each of the rolls is provided with a swivelling bow or catcher 7 the axle of which has been radially displaced with respect to the roll axle, i.e. eccentric to the same, the radius of the catcher being greater than the maximum diameter of the wound roll. At the entrance into the contact chamber there is a separating means for the breadth defined as 8.

Figure 1A:
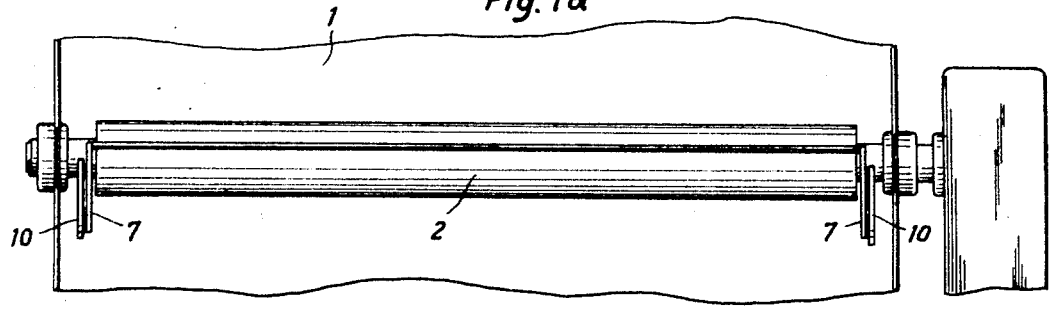
FIG. 1a is a longitudinal view of a winding roll as a detailed view.
Figure 3:
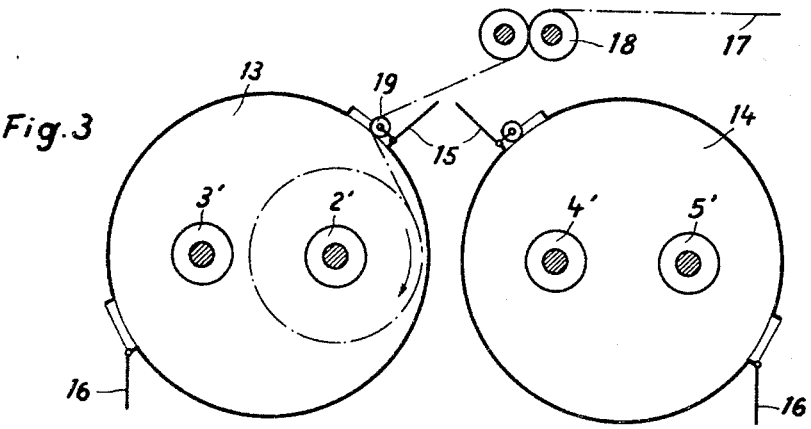
Figure 4:
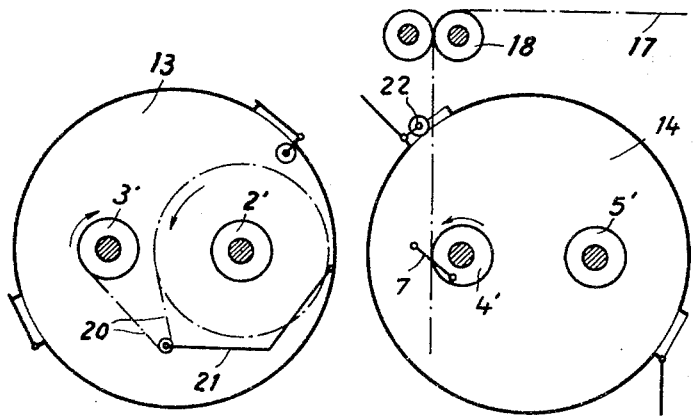

FIG. 1a is a longitudinal view of the winding up roll 2 together with the bow or catcher 7 as seen from the side of the latter.

The breadth 6 is guided between the rolls 9 into the processing or contact chamber. In this case its end is falling via the guiding plate 11 through the bow 7 of the roll 2. Now, if the roll 2 is turned into the direction of the arrow a, the bow 7 will be taken along via the arm 10 by said roll. Upon its way towards the upper roll vertex the bow swings against the roll and thus attaches the breadth so that the breadth will be wound up by the roll. When the roll 2 is fully wound, the breadth will be separated. The free end falls into the bow 7 of the rewinding roll 3. After having passed the lower roll vertex the bow 7 swings against the roll 3 when approaching the upper vertex and while pulled by the material so that the breadth is rewound from the roll 2 onto the roll 3. The direction of rotation of the roll 3 has been shown by the arrow b. In this case the roll 2 is rotating in the direction of the arrow c.

The beginning of the ingoing breadth now formed by separation is falling through the bow 7 of the winding up roll 4. In this case the guiding plate 11 has been swivelled into the position indicated by a dotted line. When the roll 4 is turned into the direction of the arrow d, the breadth is attached to the roll 4 and the breadth will be wound up onto the roll 4. After winding up the breadth will be separated again.

Together with the completion of the winding up step onto roll 4 the rewinding step onto roll 3 has also been completed which, as compared to the winding up step, has been somewhat accelerated so that the arm or bow 7 of the roll 2 is already again in its receiving position while roll 4 is still winding up whereupon roll 2 is able to receive directly. By reversing the direction of rotation of roll 3 into the direction of the arrow e the breadth end arrives at the exit shown by the two rolls 12. The breadth will now be drawn off from roll 3.

While the breadth is drawn off from roll 3, roll 4 is rewound onto the rewinding roll 5. In this case roll 4 is rotating in the direction of the arrow f and the roll 5 in the direction of the arrow g. In this case the rewinding speed has also been accelerated with respect to the winding up speed of roll 4 such that the arm or bow of roll 4 has already arrived at its receiving position while roll 3 is still winding up.

At the same time winding up roll 2 is being wound up again.

When the breadth is removed from roll 5, the latter is turning in the direction of the arrow h.

The sequence is continued as described until the entire amount of material has passed the steamer.

The chamber according to FIG. 1 may also be provided for a treatment in the presence of a high steam pressure by installing a separation wall dividing the chamber into two chambers in which case opening and closing of the chambers is effected according to the embodiment shown in FIGS. 2 to 8.

The embodiment shown in FIGS. 2, 2a through 11 is intended for overpressure steaming. The example provides for two processing chambers 13 and 14 in the form of parallel and adjacent boilers which can be tightly closed.

The processing chamber 13 comprises the pair of rolls 2′, 3′ where the roll 2′ is the winding up roll and the roll 3′ is the rewinding roll. The processing chamber 14 comprises the pair of rolls 4′, 5′ where the roll 4′ is the winding up roll and the roll 5′ is the rewinding roll.

The covers for tight closing of the inlet of the processing chambers have been identified by 15 and the covers for tight closing of the outlet of the processing chambers by 16. 17 is the breadth.

The breadth is introduced into the processing chamber according to FIG. 2 and, if so desired, it is at the same time preheated, whereupon the breadth falls through the arm or attachment bow 7 of the winding up roll 2′. The winding up roll starts to rotate in the direction of the arrow i resulting in the attachment of the breadth end at the roll and in winding up of the breadth onto the roll. After starting of the winding the guide pulley 18 which may travel horizontally, returns, as shown in broken lines, so that the cover guide roll 19 is taking over guidance of the breadth as may be seen from FIG. 3. Both covers of the processing chamber 13 are open. After completed winding of the winding up roll 2′ the breadth is separated by means of a separating means not shown in the drawing and after completed winding up of the following breadth end the processing chamber 13 is closed as may be seen from FIG. 4. According to FIG. 4 breadth feeding is switched to processing chamber 14.

In the processing chamber 13 the breadth is rewound from the winding up roll 2′ onto the rewinding roll 3′. In this case the breadth is guided in a loop 20 the formation of which may be seen from FIGS. 9 to 11. The winding up roll 2′ is associated with a bow 21. The wound winding up roll rotates in the direction k opposite to the winding up direction i. In this case the breadth end resulting from separation is falling into the arm or bow of the rewinding roll 3′ as shown in FIG. 9. When the rewinding roll 3′ rotates in the direction of the arrow 1, the bow attaches the breadth end against the rewinding roll 3′, so that the same roll is carrying along the breadth and is rewinding the breadth by pulling it off from roll 2′ (cf. FIG. 10). The bow 21 is swivelling towards the bottom and forms the loop 20 which is the contact path (cf. FIG. 11).

Figure 5:
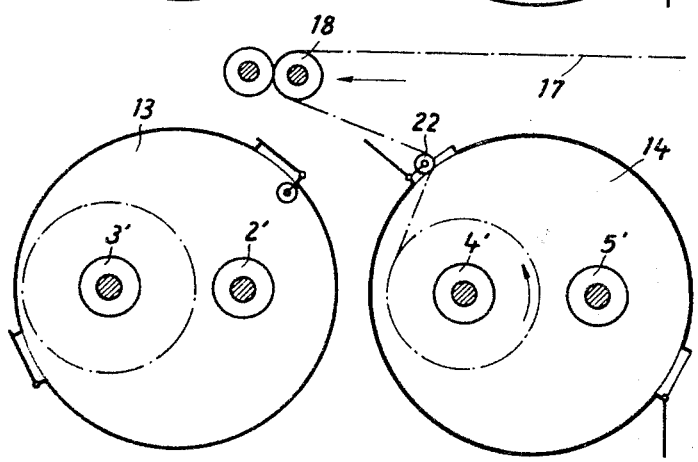

While the breadth is rewound in the processing chamber 13, the breadth is wound up in the processing chamber 14. The process is shown in FIGS. 5 and 6 on the right side. The guide roll 18 is displaced from the position permitting vertical falling of the breadth end into the processing chamber 14 and falling into the bow 7 of the winding up roll 4′ (FIG. 4), into the position in which guidance of the breadth via the cover guide roll 22 is effected. After completed winding up of the breadth onto the winding up roll 4′ the breadth is rewound onto the rewinding roll 5′ in the same way as is the case in the processing chamber 13.

Rewinding of the breadth from the winding up roll onto the rewinding roll is effected somewhat more rapidly in each case than winding up of the breadth onto the winding up roll so that, when drawing off of the breadth from the rewinding roll starts and the breadth is going to be removed from the processing chamber, the winding up roll will be ready for winding up or may be able to start with the winding up (cf. FIG. 7 on the left side).

Together with the drawing off of the breadth from the rewinding roll and the removal of the breadth, winding of the breadth onto the winding up roll is effected, as shown in FIG. 8 on the left side. In this case winding off is effected more rapidly than winding up so that the rewinding roll will already be ready to receive the breadth when winding up is completed.

The sequence in the processing chamber 14 is the same as in the processing chamber 13.

The construction of the cover, for instance, with the apparatus according to FIG. 2, is based upon FIGS. 12 and 13. In these figures the cover plate has been identified by 22. Each end of its interior surface has been provided with a bracket 23 supporting the cover guide roll 19, if the cover is intended for the ingoing side of the chamber. The plate of the cover 16 intended for the outlet of the processing chamber has not been provided with brackets and cover guide rolls.

The cover plate is supported via eyes or projections 24 on a rotary spindle 25 so that the plate is movable, the spindle in its turn being movable in the bearings 26 on the outside of the processing chamber. The spindle may be rotated by means of a handwheel 27. The projections 24 have been provided with interior threads engaging with the exterior thread 28 of the spindle. The chamber opening has been provided with a frame 29 the leg 30 of which projecting towards the outside has been provided with an inserted packing 31.

Towards the chamber the cover plate 22 has been provided with projecting edges 32 comprising teeth 33 at equal distances from each other and located at the ends of the longitudinal sides of said teeth. The exterior longitudinal side of the projecting leg 30 of the frame has been provided with similar teeth 34 located in the spaces between the others in a longitudinal sense.

If the cover is lowered, in which case the spindle 25 will also rotate, the teeth 33 at the cover edges engage into the spaces between the teeth 34 on the exterior longitudinal sides of the frame 29. The spindle 25 is then turned by means of a handwheel 27 displacing the cover plate 22 such that the cover teeth 33 are gripping below the frame teeth 34. The cover is thus closed, the insert 31 ensuring tightness of the cover.

If the cover is to be opened again, the spindle 25 and thus the cover is displaced by turning the handwheel 27 so far that the teeth 33 of the longitudinal cover edges are opposite to the spaces between the teeth 34 of the frame. The cover may then be opened.

What we claim is:
1. A method for the delayed passing of separate lengths of textile breadth or the like through a processing chamber by winding a breadth length on one roll and from this roll unwinding the length and winding it on a second roll and during said unwinding and winding applying the processing medium to the breadth between the rolls; wherein the improvement comprises the use of at least two sets of rolls, each comprising two rolls and said sets being kept in an enclosing chamber during the processing, winding successively fed breadth lengths successively upon a first roll of each set and unwinding the length from this roll and winding it onto a second roll of the same set and then unwinding the length from this second roll for removal from said chamber, the successively fed breadth lengths being alternately wound on the first roll of alternate ones of said two sets while a breadth length is being unwound from the second roll of the set other than the one on which a breadth length is being wound.

2. The method of claim 1 in which successively each breadth length wound on the first roll of each of said sets is free from this first roll and wound on the second roll of this set at about the time a breadth length is completely wound on the first roll of the other of said sets.

3. The method of claim 1 in which each breadth is fed from the first roll of said sets to the second roll thereof in the form of a loop.

4. Apparatus for processing traveling successive textile breadth lengths and the like by exposing them to a processing medium, comprising at least two sets of winding and unwinding rolls each comprising two interspaced first and second rolls, means for alternately feeding said lengths to the first roll of said sets for winding thereon alternately, means for unwinding said lengths from said first rolls of each set and winding the lengths on the second rolls of the same sets, means for unwinding the lengths from the second rolls of said sets, and processing chamber means enclosing said sets and having an entrance for the feeding lengths and an exit from which the lengths unwound from the second rolls of said sets may be removed.

5. The apparatus of claim 4 in which said chamber means comprises a separate chamber for each of said sets of which at least one chamber encloses one of said sets fluid tightly during the operation of said means for unwinding a breadth length from the first roll of this set and winding it on the second roll of this set.

References Cited

UNITED STATES PATENTS 3,188,837 6/1965 Ondarza et al. ----- 8—149.3 X
3,206,777 9/1965 Shibata ------------- 8—149.3

WILLIAM I. PRICE, *Primary Examiner.*

U.S. Cl. X.R.

8—149.3; 68—5